United States Patent [19]

Tajitsu et al.

[11] Patent Number: 5,237,428
[45] Date of Patent: Aug. 17, 1993

[54] FACSIMILE STORE AND MULTI-ADDRESS TRANSMISSION SYSTEM

[75] Inventors: Fumiko Tajitsu; Hiroshi Terada, both of Fujisawa, Japan

[73] Assignee: Matsushita Graphic Communication Systems, Inc., Tokyo, Japan

[21] Appl. No.: 653,339

[22] Filed: Feb. 11, 1991

[30] Foreign Application Priority Data

Feb. 14, 1990 [JP] Japan .................................. 2-34325
Feb. 14, 1990 [JP] Japan .................................. 2-34328

[51] Int. Cl.$^5$ .............................................. H04N 1/32
[52] U.S. Cl. ..................................... 358/440; 358/437
[58] Field of Search ............... 358/405, 407, 408, 437, 358/440, 441; 379/100

[56] References Cited

U.S. PATENT DOCUMENTS

| | | | |
|---|---|---|---|
| 4,646,160 | 2/1987 | Iizuka et al. | 379/355 |
| 4,907,255 | 3/1990 | Kurokawa | 358/436 |
| 5,001,572 | 3/1991 | Hashimoto et al. | 379/100 |
| 5,027,385 | 6/1991 | Nakagawa et al. | 379/100 |
| 5,057,941 | 10/1991 | Moriya | 358/434 |
| 5,093,857 | 3/1992 | Toshida et al. | 379/100 |

FOREIGN PATENT DOCUMENTS

| | | | |
|---|---|---|---|
| 60-46164 | 3/1985 | Japan | 358/407 |
| 61-218270 | 9/1986 | Japan | 358/440 |
| 62-40868 | 2/1987 | Japan | 358/440 |
| 62-109474 | 5/1987 | Japan . | |
| 2-87768 | 3/1990 | Japan . | |
| 3-58567 | 3/1991 | Japan . | |

*Primary Examiner*—Edward L. Coles, Sr.
*Assistant Examiner*—Kim Yen Vu
*Attorney, Agent, or Firm*—Lowe, Price, LeBlanc & Becker

[57] ABSTRACT

In a facsimile store and multi-address transmission system, received picture information is stored. The picture information is transmitted to a plurality of destination terminals. A desired transmission time is memorized which is predetermined for a specified terminal. A detection is made as to whether or not received picture information is addressed to the specified terminal. In cases where the picture information is addressed to the specified terminal, the picture information is transmitted to the specified terminal at a moment which agrees with the predetermined desired transmission time.

7 Claims, 9 Drawing Sheets

| DESTINATION | DESIGNATED TIME | INFO NUMBER |
|---|---|---|
| GENERAL AFFAIRS DIVISION | 20:00 | INFO 1 |
|  |  | INFO 2 |
|  |  | INFO 3 |
| PERSONNEL AFFAIRS DIVISION | 17:00 | INFO 2 |

FACSIMILE STORE AND MULTI-ADDRESS TRANSMISSION SYSTEM

BACKGROUND OF THE INVENTION

1. Field of the Invention

This invention relates to a facsimile store and multi-address transmission system which operates to store received picture information and then transmit the picture information to a plurality of designated destinations.

2. Description of the Prior Art

Japanese published unexamined patent application 62-109474 discloses a facsimile communication network having facsimile terminals and a facsimile store and multi-address transmission system. In the facsimile communication network of Japanese application 62-109474, when a multi-address transmission is required at one of the facsimile terminals, a mark sheet representing information of designated destinations and designated transmission times is set in the source facsimile terminal together with a sheet having picture information to be transmitted. The picture information and the destination and time information are transmitted from the source facsimile terminal to the facsimile store and multi-address transmission system. The facsimile store and multi-address transmission system operates to store the received picture information and then transmit the picture information to the facsimile terminals of the designated destinations at the designated transmission times. The mark sheet is prepared by the user. The mark sheet has first zones corresponding to different facsimile terminals, and second zones corresponding to different transmission times. The user marks the first zones corresponding to the facsimile terminals of the designated destinations, and the second zones corresponding to the designated transmission times. In some cases, marking tends to be troublesome.

SUMMARY OF THE INVENTION

It is an object of this invention to provide an improved facsimile store and multi-address transmission system.

A first aspect of this invention provides a facsimile store and multi-address transmission system comprising means for storing received picture information, and means for transmitting the picture information to a plurality of destination terminals, the improvement comprising means for memorizing a desired transmission time which is predetermined for a specified terminal; means for detecting whether or not received picture information is addressed to the specified terminal; and means for, in cases where the detecting means detects that the picture information is addressed to the specified terminal, transmitting the picture information to the specified terminal at a moment which agrees with the predetermined desired transmission time.

A second aspect of this invention provides a facsimile store and multi-address transmission system comprising means for storing received picture information, and means for transmitting the picture information to a plurality of destination terminals, the improvement comprising means for memorizing a specified terminal; means for memorizing a desired transmission time which is predetermined for the specified terminal; means for detecting whether or not received picture information is addressed to the specified terminal; and means for, in cases where the detecting means detects that the picture information is addressed to the specified terminal, transmitting the picture information to the specified terminal at a moment which agrees with the predetermined desired transmission time.

A third aspect of this invention provides a facsimile store and multi-address transmission system comprising means for storing recieved picture information, and means for transmitting the picture information to a plurality of destination terminals, the improvement comprising means for memorizing a desired transmission time which is predetermined for a specified terminal; first detecting means for detecting whether or not received picture information is addressed to the specified terminal; second detecting means for detecting whether a predetermined urgent transmission requirement is present or absent with respect to the picture information; means for, in cases where the first detecting means detects that the picture information is addressed to the specified terminal and where the second detecting means detects that the urgent transmission requirement is absent, transmitting the picture information to the specified terminal at a moment which agrees with the predetermined desired transmission time; and means for, in cases where the first detecting means detects that the picture information is addressed to the specified terminal and where the second detecting means detects that the urgent transmission requirement is present, immediately transmitting the picture information to the specified terminal independent of the predetermined desired transmission time.

A fourth aspect of this invention provides a facsimile store and multi-address transmission system comprising means for storing received picture information, and means for transmitting the picture information to a plurality of destination terminals, the improvement comprising means for memorizing a desired transmission time which is predetermined for a specified terminal; means for detecting whether or not received picture information is addressed to the specified terminal; means for replacing the predetermined transmission time by a new adjustable time; means for, in cases where the detecting means detects that the picture information is addressed to the specified terminal and where the replacing means does not replace the predetermined transmission time by the new adjustable time, transmitting the picture information to the specified terminal at a moment which agrees with the predetermined desired transmission time; and means for, in cases where the detecting means detects that the picture information is addressed to the specified terminal and where the replacing means replaces the predetermined transmission time by the new adjustable time, transmitting the picture information to the specified terminal at a moment which agrees with the new adjustable time.

DESCRIPTION OF THE FIRST PREFERRED EMBODIMENT

Figure 1:
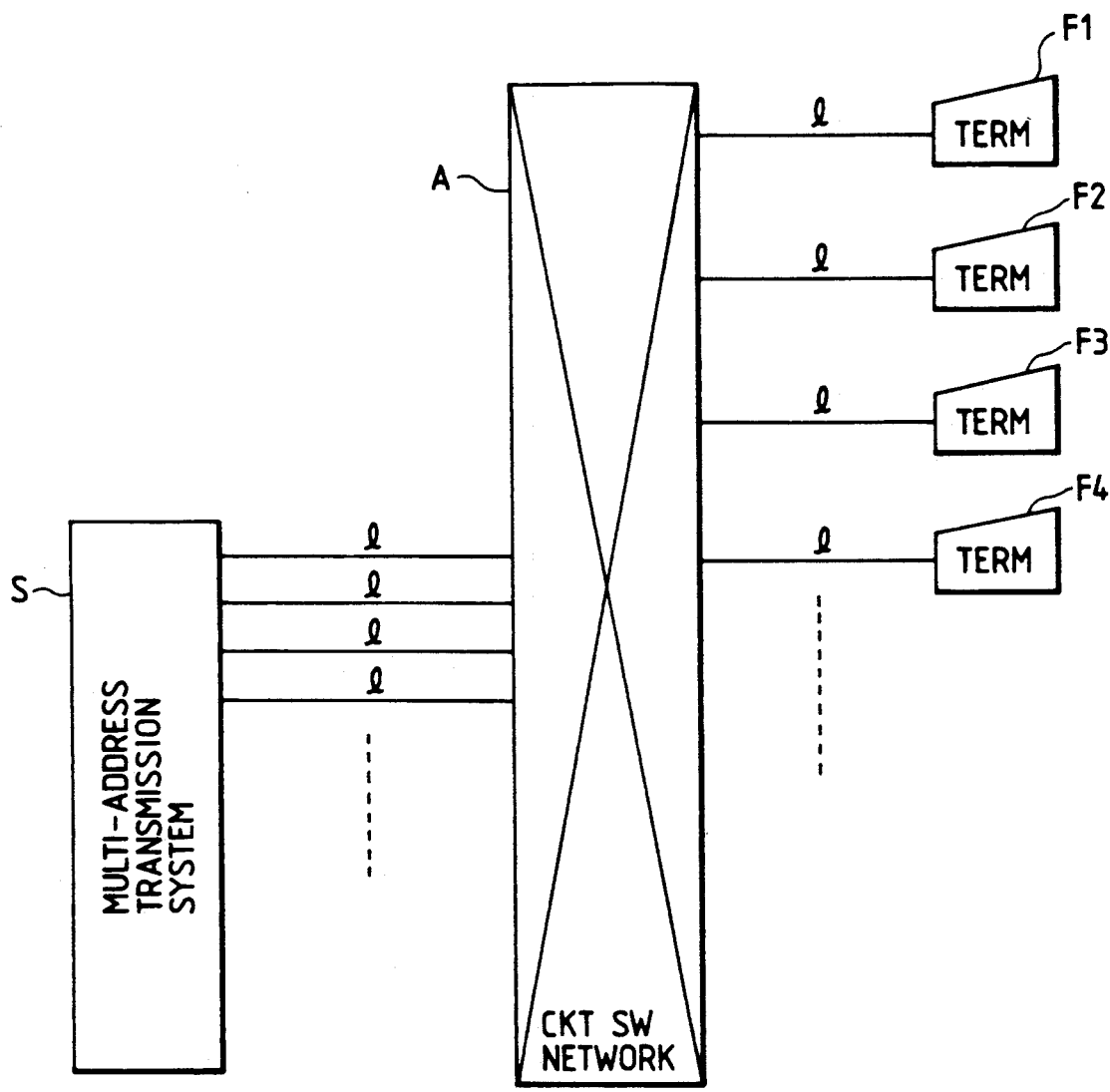
FIG. 1 is a block diagram of a facsimile communication network including a facsimile store and multi-address transmission system according to a first embodiment of this invention.

With reference to FIG. 1, a facsimile store and multi-address transmission system S is connected to a circuit switching network A by a plurality of lines 1. The facsimile store and multi-address transmission system be referred to as the multi-address transmission system hereinafter. Facsimile terminals F1, F2, . . . are connected to the circuit switching network A by lines 1 respectively.

When a multi-address transmission is required at one of the terminals F1, F2, . . . , a given signal is transmitted from the source terminal to the multi-address transmission system S to establish a call. After the call is established, a combination of picture information and administrative information is transmitted from the source terminal to the multi-address transmission system S via the lines 1 and the circuit switching network A. The administrative information includes the addresses of designated destination terminals, the address of the source terminal, and designated transmission times. The administrative information is inputted into the source terminal by use of a PB signal or an OMR sheet.

In the multi-address transmission system S, the received picture information and the received administrative information are stored. At the designated transmission times, the multi-address transmission system S transmits the picture information to the designated destination terminals via the lines 1 and the circuit switching network A. In the case where one or more of the designated destination terminals are busy, the multi-address transmission system S retries the transmission of the picture information to the busy terminals after a predetermined time elapses. When the transmission of the picture information to all the designated destination terminals is completed, the multi-address transmission system notifies the source terminal of the result of the multi-address transmission.

Figures 2, 4:
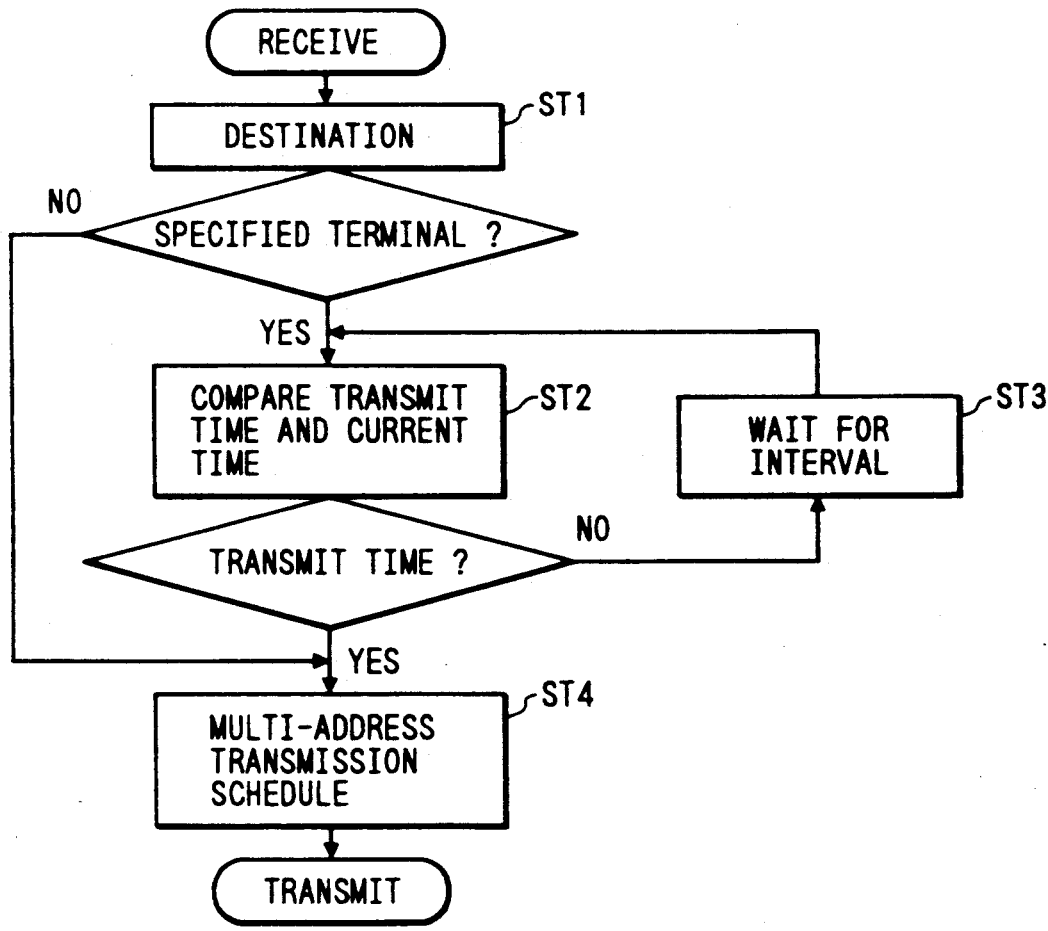
FIG. 2 is a diagram showing the contents of information stored in a special memory within the facsimile store and multi-address transmission system of FIG. 1.
FIG. 4 is a flowchart of a part of a program stored in the facsimile store and multi-address transmission system of FIG. 1.

In general, the multi-address transmission system S receives multi-address transmission requirements from a plurality of terminals. Specified one or more of the terminals F1, F2, . . . tend to be frequently designated as destinations. In the multi-address transmission system S, a special memory is prepared for such specified terminals. FIG. 2 shows an example of the contents of information stored in the special memory. In FIG. 2, a general affairs division and a personnel affairs division are defined as specified terminals. Desired transmission times of 20:00 and 17:00 are predetermined for the general affairs division and the personnel affairs division respectively. Thus, the designated time of the transmission of picture information addressed to the general affairs division is automatically set to a time of 20:00. Similarly, the designated time of the transmission of picture information addressed to the personnel affairs division is automatically set to a time of 17:00. This design makes it unnecessary to set designated times for the transmission of picture information to the general affairs division and the personnel affairs division in source terminals. In FIG. 2, picture information pieces 1, 2, and 3 are addressed to the general affairs division, and the picture information piece 2 is also addressed to the personnel affairs division.

Figure 3:
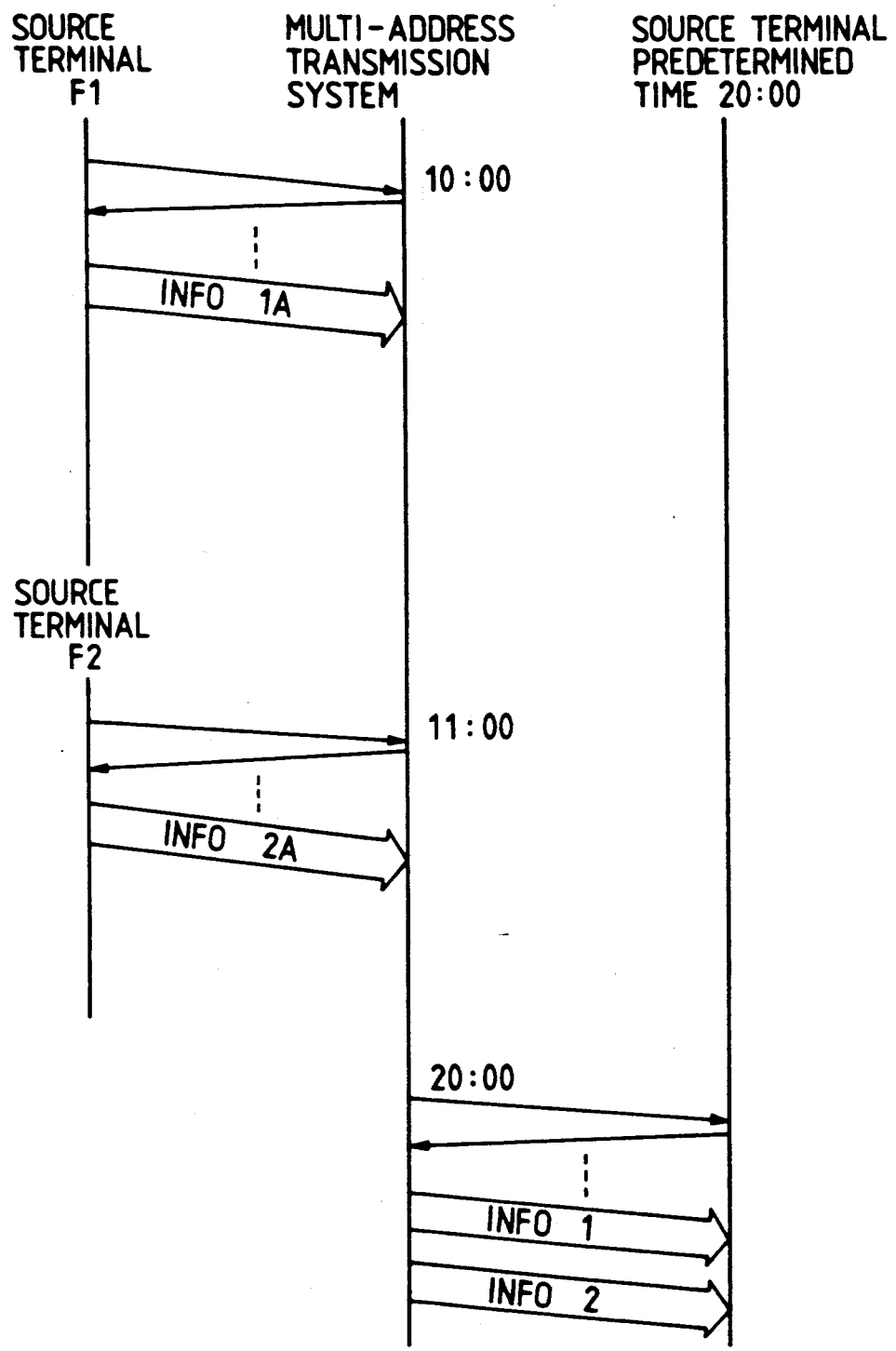
FIG. 3 is a diagram showing an example of a sequence of a multi-address transmission executed by the facsimile store and multi-address transmission system of FIG. 1.

FIG. 3 shows an example of a sequence of a multi-address transmission. In FIG. 3, the source terminal F1 transmits composite information 1A to the multi-address transmission system S at a time of 10:00. The composite information 1A has picture information 1 and administrative information. The administrative information includes a designated destination or destinations to which the picture information 1 is addressed. In this case, the picture information 1 is addressed to the general affairs division. Since the general affairs division corresponds to a specified terminal, it is unnecessary to feed the source terminal F1 with information of a designated time for the transmission of the picture information 1 to the destination. The source terminal F2 transmits composite information 2A to the multi-address transmission system S at a time of 11:00. The composite information 2A has picture information 2 and administrative information. The administrative information includes a designated destination or destinations to which the picture information 2 is addressed. In this case, the picture information 2 is addressed to the general affairs division. Since the general affairs division corresponds to a specified terminal, it is unnecessary to feed the source terminal F1 with information of a designated time for the transmission of the picture information 2 to the destination. In the multi-address transmission system S, the designated time of the transmission of the picture information 1 and the picture information 2 addressed to the general affairs division is automatically set to a time of 20:00. At a time of 20:00, the multi-address transmission system S transmits the picture information 1 and the picture information 2 to the general affairs division.

The multi-address transmission system S includes a normal memory for storing picture information and administrative information related to terminals other than the specified terminals. In addition, the multi-address transmission system S includes a microprocessor or a similar device which operates in accordance with a program stored in its internal ROM. FIG. 4 is a flowchart of a part of this program which operates on received picture information and received administrative information.

In FIG. 4, a first step ST1 of the program decides whether or not a designated destination related to received picture information agrees with one of specified terminals. When the designated destination agrees with one of the specified terminals, the program advances from the step ST1 to a step ST2. When the designated destination disagrees with any of the specified terminals, the program advances from the step ST1 to a step ST4. The step ST2 decides whether or not the current moment reaches a predetermined transmission time related to the specified terminal. When the current moment does not reach the predetermined transmission time, the program advances from the step ST2 to a step ST3. When the current moment reaches the predetermined transmission time, the program advances from the step ST2 to the step ST4. The step ST3 waits for a given interval. After the step ST3, the program returns to the step ST2. The step ST4 sets the picture information and the administrative information into a multi-address transmission schedule, so that the picture information addressed to a specified terminal will be transmitted to the specified terminal at a predetermined time while the picture information addressed to one or more of terminals different from the specified terminals will be transmitted to them at designated times.

DESCRIPTION OF THE SECOND PREFERRED EMBODIMENT

A second embodiment of this invention is similar to the embodiment of FIGS. 1–4 except for design changes indicated hereinafter.

Figure 5:
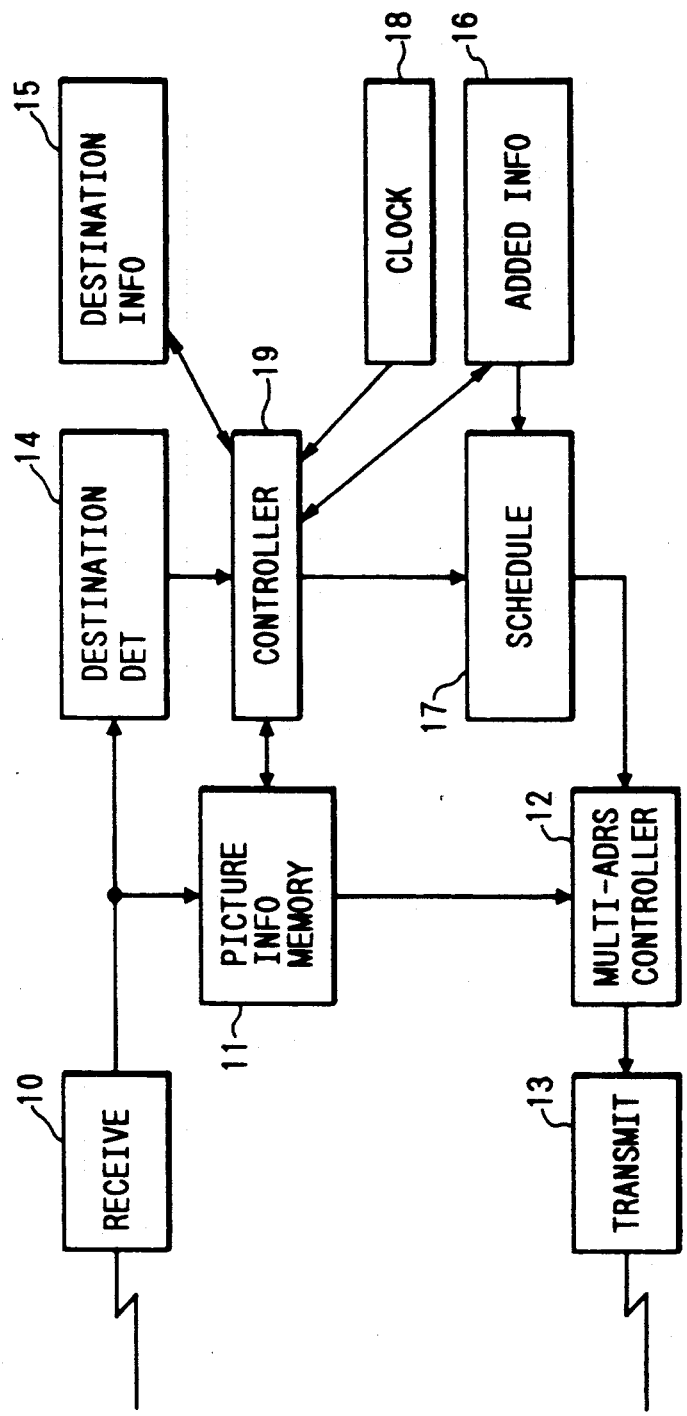
FIG. 5 is a block diagram of a facsimile store and multi-address transmission system according to a second embodiment of this invention.

With reference to FIG. 5, a multi-address transmission system includes a combinations of various sections 10–19. A main controller 19 operates to control the whole of the multi-address transmission system.

A receiver 10 operates to receive combinations of picture information and administrative information from source terminals. The received picture information and the received administrative information are outputted from the receiver 10 to a picture information memory 11 and a destination information detector 14. As described previously, the administrative information includes information of designated destinations and information of designated transmission times. In some cases, the administrative information includes a requirement for an urgent transmission of the picture information. The destination information, the transmission time information, and the urgent transmission requirement are inputted into the source terminals by OMR sheets or PB signals. The destination information detector 14 detects the destination information and the urgent transmission requirement from the output information of the receiver 10. The detected destination information and the detected urgent transmission requirement are fed from the destination information detector 14 to the controller 19.

The picture information and the administrative information outputted from the receiver 10 are stored into the picture information memory 11. The picture information memory 11 is controlled by the controller 19 in response to the destination information outputted from the destination information detector 14. As a result of the control of the picture information memory 11, pieces of the stored picture information and pieces of the stored designated time information are arranged in accordance with the designated destinations.

A multi-address transmission controller 12 transfers the picture information from the picture information memory 11 to a transmitter 13 at a moment corresponding to the designated transmission time. The multi-address transmission controller 12 executes the information transfer from the picture information memory 11 to the transmitter 13 in accordance with a transmission schedule generated by a schedule section 17. The transmitter 13 operates to transmit the picture information to the designated destination at the designated time. In the case where the designated destination is busy, the transmitter 13 retries the transmission of the picture information after a given interval elapses.

The controller 19 stores destination information into a destination information memory 15. The destination information includes the moments of the transmission of the picture information and the number of times of the transmission retry.

When two or more of the designated transmission times are equal to each other, an added information generator 16 connected to the controller 19 functions to generate information which determines the priority of transmission. The priority information is fed from the added information generator 16 to the schedule section 17. The schedule section 17 receives time information from the controller 19. The schedule section 17 generates a transmission schedule in response to the priority information and the time information. A clock 18 feeds the controller 19 with information representing the current moment.

A description will now be given of the operation of the multi-address transmission system of FIG. 5. After the receiver 10 receives a combination of picture information and administrative information from a source terminal, the receiver 10 feeds the received picture information and the administrative information to the picture information memory 11 and the destination information detector 14. The destination information detector 14 detects destination information from the administrative information and outputs the destination information to the controller 19. The picture information memory 11 is controlled by the controller 19 in response to the destination information so that the picture information and the transmission time information are stored into the area of the picture information memory 11 which is allotted to the designated destination. Such an information storing process is executed for each reception of picture information and administrative information from a source terminal. As a result, in the picture information memory 11, pieces of the picture information and pieces of the designated time information are arranged in accordance with the designated destinations. With respect to picture information addressed to a specified terminal, related transmission time information can be absent. For such picture information, a given transmission time is predetermined in the picture information memory 11.

FIG. 2 shows an example of the contents of information stored in the picture information memory 11. In FIG. 2, a general affairs division and a personnel affairs division are defined as specified terminals. Desired transmission times of 20:00 and 17:00 are predetermined for the general affairs division and the personnel affairs division respectively. Thus, the designated time of the transmission of picture information addressed to the general affairs division is automatically set to a time of 20:00. Similarly, the designated time of the transmission of picture information addressed to the personnel affairs division is automatically set to a time of 17:00. In FIG. 2, picture information pieces 1, 2, and 3 are addressed to the general affairs division, and the picture information piece 2 is also addressed to the personnel affairs division.

With respect to FIGS. 2 and 5, when the current moment fed by the clock 18 reaches a moment of 20:00, the picture information piece 1, 2, and 3 are outputted from the picture information memory 11 to the multi-address transmission controller 12. The added information generator 16 determines the transmission priority among the picture information pieces 1, 2, and 3. The schedule section 17 generates a schedule of the transmission of the picture information pieces 1, 2, and 3 on the basis of the transmission priority. The picture information pieces 1, 2, and 3 are transmitted via the multi-address transmission controller 12 and the transmitter 13 to the destination terminal in a sequence determined by the transmission schedule.

When an urgent transmission requirement is detected by the destination information detector 14, the detected urgent transmission requirement is fed to the controller 19. The controller 19 controls the schedule section 17 in response to the urgent transmission requirement so that the related picture information will be promptly read out from the picture information memory 11 and will be immediately transmitted to the related destination via the multi-address transmission controller 12 and the transmitter 13.

Figure 6:
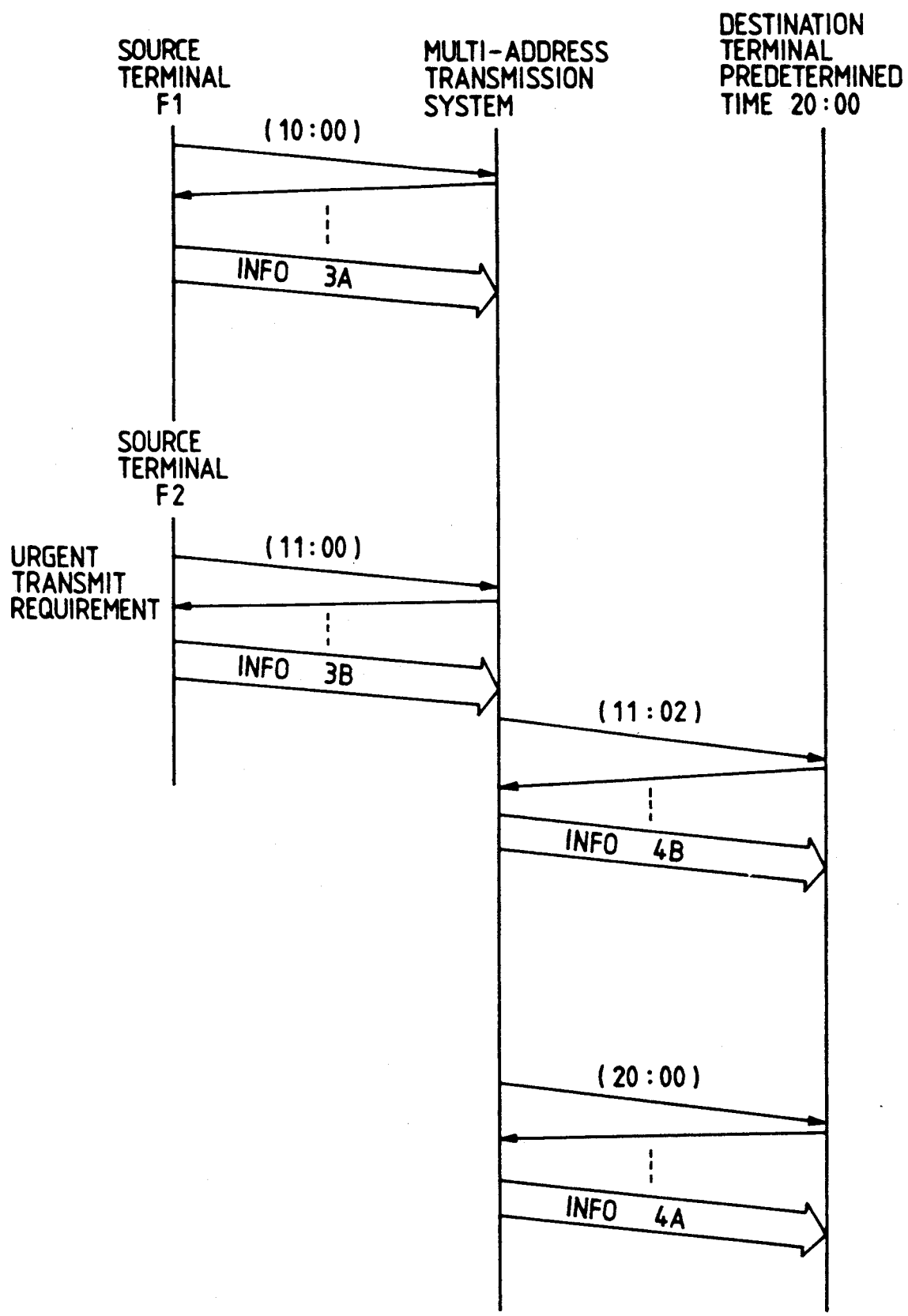
FIG. 6 is a diagram showing an example of a sequence of a multi-address transmission executed by the facsimile store and multi-address transmission system of FIG. 5.

FIG. 6 shows an example of a sequence of a multi-address transmission. In FIG. 6, a source terminal F1 transmits composite information 3A to the multi-address transmission system at a time of 10:00. The composite information 3A has picture information 4A and administrative information. The administrative information includes a designated destination or destinations to which the picture information 4A is addressed. In this case, the picture information 4A is addressed to a specified terminal. In the multi-address transmission system, the designated time of the transmission of the picture information 4A addressed to the specified terminal is automatically set to a time of 20:00. A source terminal F2 transmits composite information 3B to the multi-address transmission system at a time of 11:00. The composite information 3B has picture information 4B and administrative information. The administrative information includes a designated destination or destinations to which the picture information 4B is addressed. In this case, the picture information 4B is addressed to the specified terminal. In addition, the administrative information includes a requirement for an urgent transmission of the picture information 4B. The urgent transmission requirement is inputted into the source terminal F2 by use of an OMR sheet or a PB signal. In the multi-address transmission system, the urgent transmission requirement is detected by the destination information detector 14, and the detected urgent transmission requirement is fed to the controller 19. The controller 19 controls the schedule section 17 in response to the urgent transmission requirement, so that the picture information 4B is promptly read out from the picture information memory 11 and is immediately transmitted to the specified terminal via the multi-address transmission controller 12 and the transmitter 13. Thus, the multi-address transmission system transmits the picture information 4B to the specified terminal at a time of 11:02. At a time of 20:00, the multi-address transmission system transmits the picture information 4A to the specified terminal.

Figure 7:
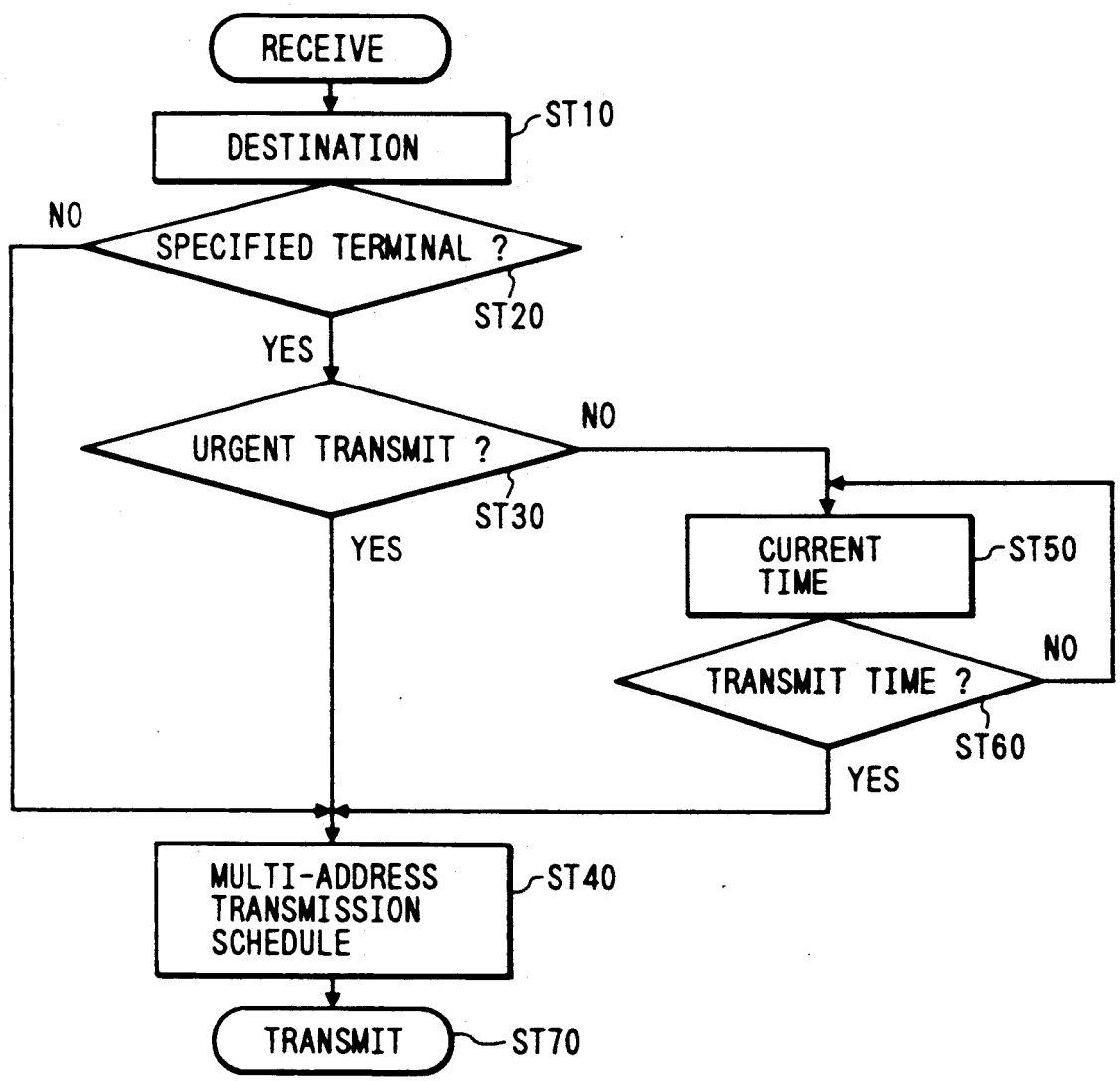
FIG. 7 is a flowchart of a part of a program operating the controller of FIG. 5.

The controller 19 includes a microprocessor or a similar device which operates in accordance with a program stored in its internal ROM. FIG. 7 is a flowchart of a part of this program which operates on received picture information and received administrative information.

In FIG. 7, a first step ST10 detects a designated destination related to received picture information. A step ST20 following the step ST10 decides whether or not the designated destination agrees with one of specified terminals. When the designated destination agrees with one of the specified terminals, the program advances from the step ST20 to a step ST30. When the designated destination disagrees with any of the specified terminals, the program advances from the step ST20 to a step ST40. The step ST30 decides whether an urgent transmission requirement is present or absent. When the urgent transmission requirement is absent, the program advances from the step ST30 to a step ST50. When the urgent transmission requirement is present, the program jumps from the step ST30 to the step ST40. The jump from the step ST30 to the step ST40 enables a prompt transmission of the picture information associated with the urgent transmission requirement. The step ST50 detects the current moment by referring to the output signal from the clock 18. A step ST60 following the step ST50 decides whether or not the current moment reaches a predetermined transmission time related to the specified terminal. When the current moment does not reach the predetermined transmission time, the program returns from the step ST60 to the step ST50. When the current moment reaches the predetermined transmission time, the program advances from the step ST60 to the step ST40. In this way, with respect to picture information addressed to a specified terminal but unrelated to an urgent transmission requirement, a waiting process is done until the current moment reaches a predetermined transmission time. The step ST40 sets the picture information and the administrative information into a multi-address transmission schedule. A step ST70 following the step ST40 generates an instruction of transmitting the picture information to the designated terminal.

DESCRIPTION OF THE THIRD PREFERRED EMBODIMENT

A third embodiment of this invention is similar to the embodiment of FIGS. 5-7 except for design changes indicated hereinafter.

Figure 8:
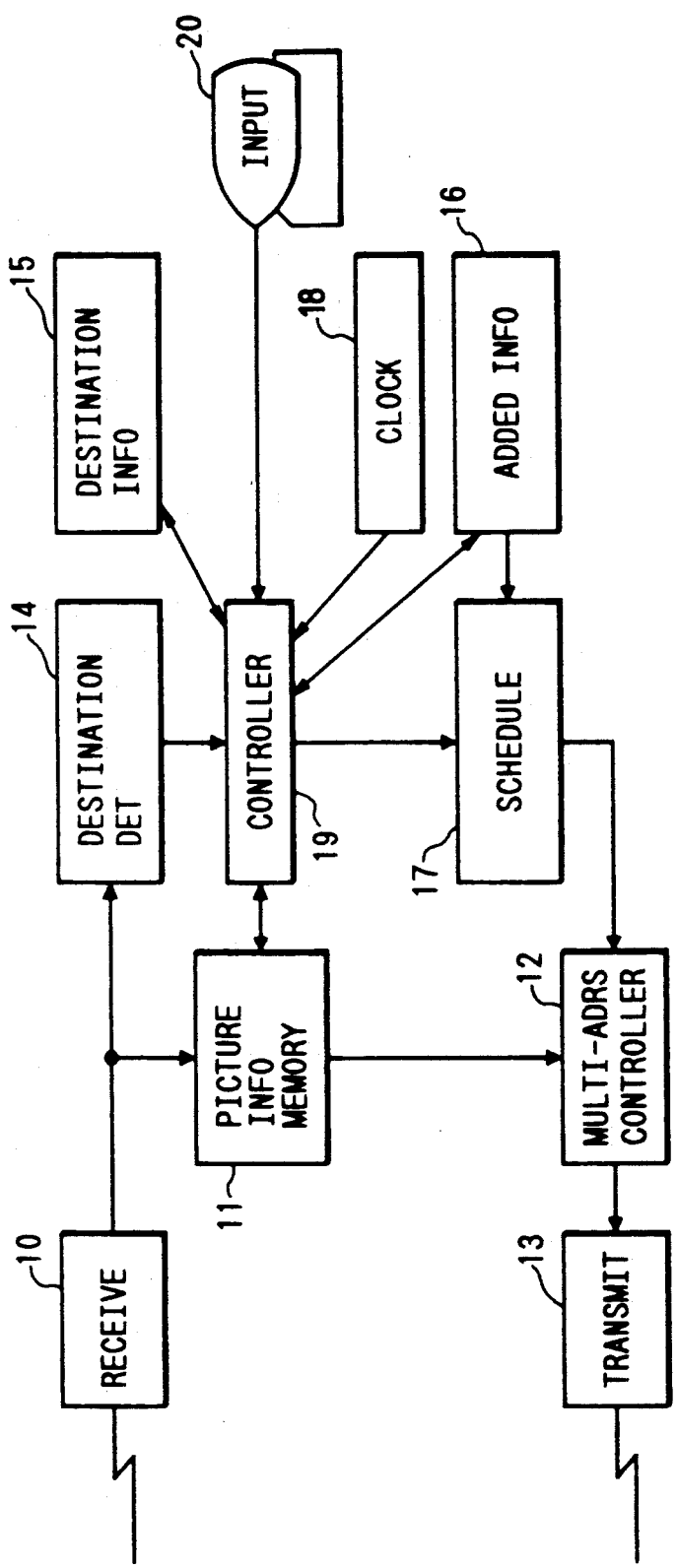
FIG. 8 is a block diagram of a facsimile store and multi-address transmission system according to a third embodiment of this invention.

With reference to FIG. 8, a multi-address transmission system includes an input device 20 in addition to sections 10-19. The input device 20 is connected to a main controller 19. Desired transmission times predetermined in a picture information memory 11 with respect to specified terminals can be changed by operating the input device 20.

Figure 9:
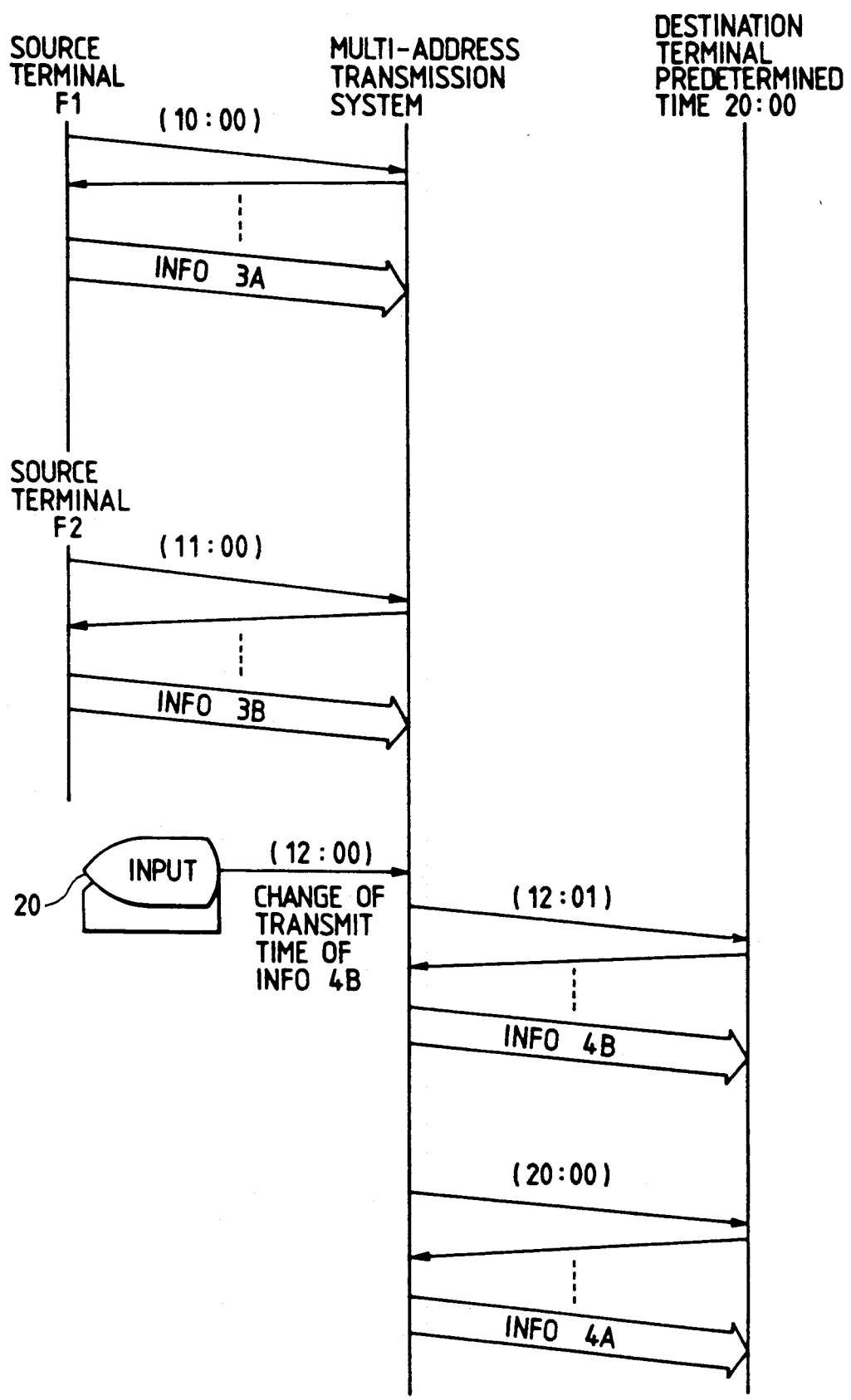
FIG. 9 is a diagram showing an example of a sequence of a multi-address transmission executed by the facsimile store and multi-address transmission system of FIG. 8.

FIG. 9 shows an example of a sequence of a multi-address transmission. In FIG. 9, a source terminal F1 transmits composite information 3A to the multi-address transmission system at a time of 10:00. The composite information 3A has picture information 4A and administrative information. The administrative information includes a designated destination or destinations to which the picture information 4A is addressed. In this case, the picture information 4A is addressed to a specified terminal, that is, a general affairs division. In the multi-address transmission system, the designated time of the transmission of the picture information 4A addressed to the specified terminal is automatically set to a time of 20:00. A source terminal F2 transmits composite information 3B to the multi-address transmission system at a time of 11:00. The composite information 3B has picture information 4B and administrative information. The administrative information includes a designated destination or destinations to which the picture information 4B is addressed. In this case, the picture information 4B is addressed to the specified terminal, that is, the general affairs division. In the multi-address transmission system, the designated time of the transmission of the picture information 4B addressed to the specified terminal is automatically set to a time of 20:00. It is now assumed that a requirement for an urgent transmission of the picture information 4B occurs at or immediately before a time of 12:00. The operator of the multi-address transmission system actuates the input device 20 at a time of 20:00, and the controller 19 controls the picture information memory 11 in response to the output signal from the input device 20 so that the designated transmission time of the picture information 4B will be changed from a time of 20:00 to the current moment. In addition, the controller 19 controls the schedule section 17 in response to the output signal from the input device 20, so that the picture information 4B is promptly read out from the picture information memory 11 and is immediately transmitted to the specified terminal via the multi-address transmission controller 12 and the transmitter 13. Thus, the multi-address transmission system transmits the picture information 4B to the specified terminal at a time of 12:00. At a time of 20:00, the multi-address transmission system transmits the picture information 4A to the specified terminal.

Figure 10:
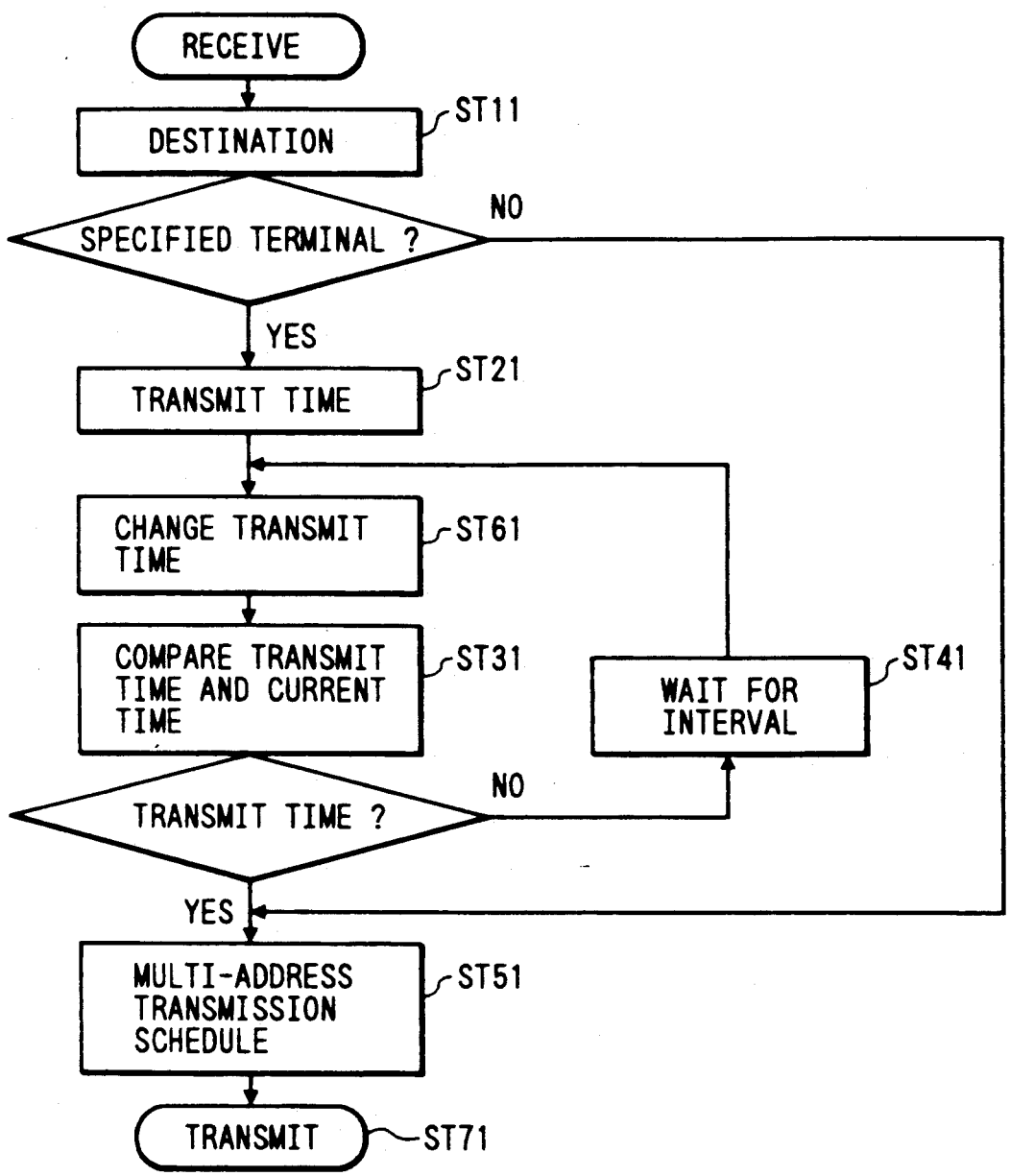
FIG. 10 is a flowchart of a part of a program operating the controller of FIG. 8.

The controller 19 includes a microprocessor or a similar device which operates in accordance with a program stored in its internal ROM. FIG. 10 is a flowchart of a part of this program which operates on received picture information and received administrative information.

In FIG. 10, a first step ST11 detects a designated destination related to received picture information. Then, the step ST11 decides whether or not the designated destination agrees with one of specified terminals. When the designated destination agrees with one of the specified terminals, the program advances from the step ST11 to a step ST21. When the designated destination disagrees with any of the specified terminals, the program advances from the step ST11 to a step ST51. The step 21 sets a predetermined transmission time with respect to the specified terminal which agrees with the designated destination. After the step ST21, the program advances to a step ST61. The step ST61 checks the output signal from the input device 20. When the output signal from the input device 20 requires the predetermined transmission time to be replaced by a new transmission time, the step ST61 replaces the predetermined transmission time by the new transmission time. The new transmission time can be adjusted by operating the input device 20. When the output signal from the input device 20 does not require the replacement of the predetermined transmission time, the step ST61 holds the predetermined transmission time unchanged. A step ST31 following the step ST61 detects the current moment by referring to the output signal from the clock 18. In addition, the step ST61 decides whether or not the current moment reaches the transmission time. When the current moment does not reach the transmission time, the program advances from the step ST31 to a step ST41. When the current moment reaches the predetermined transmission time, the program advances from the step ST31 to the step ST51. The step ST41 waits for a given interval. After the step ST41, the program returns to the step ST61. The step ST51 sets the picture information and the administrative information into a multi-address transmission schedule. A step ST71 following the step ST51 generates an instruction of transmitting the picture information to the designated terminal. Thus, in the case where the predetermined transmission time is replaced by the new transmission time, the picture information is transmitted to the designated terminal at a moment which agrees with the new transmission time. In the case where the predetermined transmission time remains unchanged, the picture information is transmitted to the designated terminal at a moment which agrees with the predetermined transmission time.

What is claimed is:

1. In a facsimile store and multi-address transmission system comprising means for storing received picture information, and means for transmitting the picture information to a plurality of destination terminals, a method comprising:

a first step of memorizing a desired transmission time which is predetermined for a specified terminal;

a second step of detecting whether or not received picture information is addressed to the specified terminal;

a third step of receiving an urgent transmission requirement from a terminal via a PB signal;

a fourth step of detecting whether said predetermined urgent transmission requirement is present or absent with respect to the picture information;

a fifth step of, in cases where the second step detects that the picture information is addressed to the specified terminal and where the third step detects that the urgent transmission requirement is absent, transmitting the picture information to the specified terminal at a moment which agrees with the predetermined desired transmission time; and a sixthe step of, in cases where the second step detects that the picture information is addressed to the specified terminal and where the third step detects that the urgent transmission requirement is present, immediately transmitting the picture information to the specified terminal independent of the predetermined desired transmission time.

2. In a facsimile store and multi-address transmission system comprising means for storing received picture information, and means for transmitting the picture information to a plurality of destination terminals, a method comprising:

a first step of memorizing a desired transmission time which is predetermined for a specified terminal;

a second step of detecting whether or not received picture information is addressed to the specified terminal;

a third step of receiving an urgent transmission requirement from a terminal via a mark sheet;

a fourth step of detecting whether said predetermined urgent transmission requirement is present or absent with respect to the picture information;

a fifth step of, in cases where the second step detects that the picture information is addressed to the specified terminal and where the third step detects that the urgent transmission requirement is absent, transmitting the picture information to the specified terminal at a moment which agrees with the predetermined desired transmission time; and a sixth step of, in cases where the second step detects that the picture information is addressed to the specified terminal and where the third step detects that the urgent transmission requirement is present, immediately transmitting the picture information to the specified terminal independent of the predetermined desired transmission time.

3. A facsimile store and multi-address transmission system comprising means for storing received picture information, and means for transmitting the picture information to a plurality of destination terminals, the improvement comprising:

means for memorizing a desired transmission time which is predetermined for a specified terminal;

means for detecting whether or not received picture information is addressed to the specified terminal;

means for replacing the predetermined transmission time by a new adjustable time;

means for, in cases where the detecting means detects that the picture information is addressed to the specified terminal and where the replacing means does not replace the predetermined transmission time by the new adjustable time, transmitting the picture information to the specified terminal at a moment which agrees with the predetermined desired transmission time; and means for, in cases where the detecting means detects that the picture information is addressed to the specified terminal and where the replacing means replaces the predetermined transmission time by the new adjustable time, transmitting the picture information to the specified terminal at a moment which agrees with the new adjustable time.

4. A facsimile store and multi-address transmission system comprising means for storing received picture information, and means for transmitting the picture information to a plurality of destination terminals, the improvement comprising:

means for memorizing a desired transmission time which is predetermined for a specified terminal;

first detecting means for detecting whether or not received picture information is addressed to the specified terminal;

second detecting means for detecting whether a predetermined urgent transmission requirement is present or absent with respect to the picture information;

means for, in cases where the first detecting means detects that the picture information is addressed to the specified terminal and where the second detecting means detects that the urgent transmission requirement is absent, transmitting the picture information to the specified terminal at a moment which agrees with the predetermined desired transmission time; and means for, in cases where the first detecting means detects that the picture information is addressed to the specified terminal and where the second detecting means detects that the urgent transmission requirement is present, immediately transmitting the picture information to the specified terminal independent of the predetermined desired transmission time, wherein the urgent transmission requirement is fed from a terminal via a PB signal.

5. A facsimile store and multi-address transmission system comprising means for storing received picture information, and means for transmitting the picture information to a plurality of destination terminals, the improvement comprising:

means for memorizing a desired transmission time which is predetermined for a specified terminal;

first detecting means for detecting whether or not received picture information is addressed to the specified terminal;

second detecting means for detecting whether a predetermined urgent transmission requirement is present or absent with respect to the picture information;

means for, in cases where the first detecting means detects that the picture information is addressed to the specified terminal and where the second detecting means detects that the urgent transmission requirement is absent, transmitting the picture information to the specified terminal at a moment which agrees with the predetermined desired transmission time; and means for, in cases where the first detecting means detects that the picture information is addressed to the specified terminal and where the second detecting means detects that the urgent transmission requirement is present, immediately transmitting the picture information to the specified terminal independent of the predetermined desired transmission time, wherein the urgent transmission is fed from a terminal via a mark sheet.

6. A facsimile store and multi-address transmission system comprising means for storing received picture information, and means for transmitting the picture information to a plurality of destination terminals, the improvement comprising:

means for memorizing a desired transmission time which is predetermined for a specified terminal;

first detecting means for detecting whether or not received picture information is addressed to the specified terminal;

second detecting means for detecting whether a predetermined urgent transmission requirement is present or absent with respect to the picture information;

means for, in cases where the first detecting means detects that the picture information is addressed to the specified terminal and where the second detecting means detects that the urgent transmission requirement is absent, transmitting the picture information to the specified terminal at a moment which agrees with the predetermined desired transmission time; and means for, in cases where the first detecting means detects that the picture information is addressed to the specified terminal and where the second detecting means detects that the urgent transmission requirement is present, immediately transmitting the picture information to the specified terminal independent of the predetermined desired transmission time.

7. The facsimile store and multi-address transmission system of claim 6 wherein said urgent transmission requirement is indicated in response to a manually activated switching means.

* * * * *